(12) United States Patent
Herriot

(10) Patent No.: US 10,837,769 B2
(45) Date of Patent: Nov. 17, 2020

(54) SYSTEMS AND METHODS FOR LOCATING GROUND AND AIR RADIO ANTENNAE FOR GROUND-TO-AIR AND AIR-TO-AIR COMMUNICATIONS NETWORKS

(71) Applicant: SMARTSKY NETWORKS LLC, Morrisville, NC (US)

(72) Inventor: James W. Herriot, Palo Alto, CA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

(21) Appl. No.: 16/444,233

(22) Filed: Jun. 18, 2019

(65) Prior Publication Data

US 2019/0323833 A1 Oct. 24, 2019

Related U.S. Application Data

(63) Continuation of application No. 13/998,302, filed on Oct. 18, 2013, now Pat. No. 10,371,514.

(60) Provisional application No. 61/715,437, filed on Oct. 18, 2012.

(51) Int. Cl.
*G01B 21/16* (2006.01)
*H04W 16/18* (2009.01)

(52) U.S. Cl.
CPC ............ *G01B 21/16* (2013.01); *H04W 16/18* (2013.01)

(58) Field of Classification Search
CPC .............................. G01B 21/16; H04W 16/18
USPC .......... 702/97, 144, 150, 156, 158; 370/338; 455/11.1, 404.1, 404.2, 428, 456.2
See application file for complete search history.

(56) References Cited

U.S. PATENT DOCUMENTS

| | | | |
|---|---|---|---|
| 6,073,013 A | 6/2000 | Agre | |
| 8,938,211 B2 | 1/2015 | Das et al. | |
| 9,148,215 B1* | 9/2015 | Bonawitz | ........... H04B 7/18506 |
| 9,395,189 B2 | 7/2016 | Sridhara et al. | |
| 2015/0063202 A1* | 3/2015 | Mazzarella | ............. H04W 4/90 370/316 |

* cited by examiner

*Primary Examiner* — John H Le
(74) *Attorney, Agent, or Firm* — Burr & Forman, LLP

(57) ABSTRACT

The present disclosure provides a method and a system for determining locations of telecommunication ground stations. In one aspect, the method includes creating heat map data set representing air traffic volume at grid units of a geographic region, determining a ground station location at one of the grid units having air traffic volume greater than that of others of the grid units, modifying the heat map data by excluding data representing one or more of the grid units surrounding the ground station location, and repeating the determining and modifying steps until a predetermined quantity of ground station locations is determined.

20 Claims, 12 Drawing Sheets

100

400

200

300

500

600

SYSTEMS AND METHODS FOR LOCATING GROUND AND AIR RADIO ANTENNAE FOR GROUND-TO-AIR AND AIR-TO-AIR COMMUNICATIONS NETWORKS

FIELD OF THE INVENTION

The present invention relates to ground-to-air and air-to-air communications networks and, more particularly, to packetized communication networks.

RELATED ART

Network connectivity on aircrafts has gained popularity recently. In order to connect a passenger's telecommunication device to a communications network (e.g., the Internet) when the passenger is flying in an aircraft, it is often required that the aircraft be within a radio communication range of one or more ground stations. Usually, the construction cost of a ground station is very high. As such, it is quintessentially important to properly select the location of ground stations, so as to minimize the overall cost for building and maintaining such ground stations.

SUMMARY OF THE INVENTION

Disclosed herein are method, systems and algorithms for choosing and evaluating geographical locations for candidate ground and air radio antennae (broadcasting and receiving) stations for ground-to-air and air-to-air packetized communication networks. More specifically, computational landscape searches, annealing, and genetic algorithms are utilized to determine the optimal locations for ground stations, including to find the best point(s) in the abstract trade-off space of competing requirements. These points correspond to actual candidate geographical locations for ground stations best placed to support an operational mesh-based packetized (Internet protocol IP) communications network. Also disclosed are techniques that utilize grid squares, measurement techniques, and analysis methods for determining the network accessibility of aircraft—all in a dynamically changing environment where aircraft (and their on-board network radio stations) are continuously changing their locations in geographical space. Together, the above algorithms and techniques enable creation of low cost, low latency, high reliability, high bandwidth, next generation communications network for the sky.

In accordance with one aspect, the disclosure provides a method for determining locations of telecommunication ground stations. The method comprises: A) creating a heat map data set representing air traffic volume at grid units of a geographic region; B) determining a ground station location at one of the grid units having air traffic volume greater than that of others of the grid units; C) modifying the heat map data by excluding data representing one or more of the grid units surrounding the ground station location; and D) repeating B) and C) until a predetermined quantity of ground station locations is determined.

In one embodiment, step A) comprises: A1) providing geographic data representing the geographic region, the geographic data including grid data representing the grid units; A2) providing air traffic data representing origin and destination of flights within a predetermined time period; A3) calculating a trajectory for each of the flights using the air traffic data and the geographic data; and A4) incrementally counting a number of hits for each of the grid units, if the trajectory for each of the flights coincides with the grid units. Step A) further comprises: A5) creating the heat map in accordance with a total number of hits for each of the grid units.

In one embodiment, the air traffic volume is represented by the total number of hits for each of the grid units. In another embodiment, the air traffic data comprises data representing a number of seats for each of the flights, and the air traffic volume is represented by the total number of hits for each of the grid units modified by the number of seats for each of the flights.

In one embodiment, step A4) comprises: A4-1) assigning an extended area around an aircraft traversing a flight trajectory; and A4-2) incrementally counting a number of hits for each of the grid units, if the extended area coincides with the grid units. Each of the grid units corresponds to a grid square of about 0.1 arc degree.

In one embodiment, step C) comprises: C1) modifying the heat map data set by excluding data representing one or more of the grid units surrounding the ground station location in accordance with a communication range of a ground station antenna.

In accordance with another aspect, the disclosure provides a system for determining locations of telecommunication ground stations, the system comprising a processor and a memory coupled to the processor for storing data to be processed by the processor. The system further comprises: A) program logic configured to create heat map data set representing air traffic volume at grid units of a geographic region; B) program logic configured to determine a ground station location at one of the grid units having air traffic volume greater than that of others of the grid units; and C) program logic configured to modify the heat map data set by excluding data representing one or more of the grid units surrounding the ground station location.

In one embodiment, element A) comprises: A1) program logic configured to calculate a trajectory for each of the flights using the air traffic data and the geographic data; A2) program logic configured to incrementally count a number of hits for each of the grid units, if the trajectory for each of the flights coincides with the grid units; and A3) program logic configured to create the heat map data in accordance with a total number of hits for each of the grid units.

In one embodiment, element A2) comprises: A2-1) program logic configured to assign an extended area around an aircraft traversing a flight trajectory; and A2-2) program logic configured to incrementally count a number of hits for each of the grid units, if the extended area coincides with the grid units.

In one embodiment, element C) comprises: C1) program logic configured to modify the heat map data set by excluding data representing one or more of the grid units surrounding the ground station location in accordance with a communication range of a ground station antenna.

In accordance with yet another aspect, the disclosure provides a method for establishing network communications from an aircraft. The method comprising establishing a first communication channel between a first aircraft and a ground station having an antenna, the first aircraft being located within a communication range of the antenna, and establishing a second communication channel between a second aircraft and the first aircraft, the second aircraft being located outside of the communication range of the antenna, wherein a communication device on the second aircraft is communicably coupled to a communications network through the second communication channel and the first communication channel. In one embodiment, the communication range comprises a substantially circular region centered around the ground station.

In accordance with still another aspect, the disclosure provides a mesh communications network system comprising: a ground station having an antenna with a communication range, the ground station communicably coupled to a communications network; a plurality aircraft, at least one of which is at least temporarily located within the communication range of the ground station antenna; and a communication channel established between a communication device on one of the plurality of aircraft which is at least temporarily located out of the communication range of the ground station antenna and the communications network, beyond line of site, communication channel being connected to the ground station by at least one of the plurality of aircraft that is within range of the ground station.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will be more completely understood through the following description, which should be read in conjunction with the drawings in which.

DETAILED DESCRIPTION

Ground-to-Air Communications—Geographical Locating of Ground Stations

Figure 1:
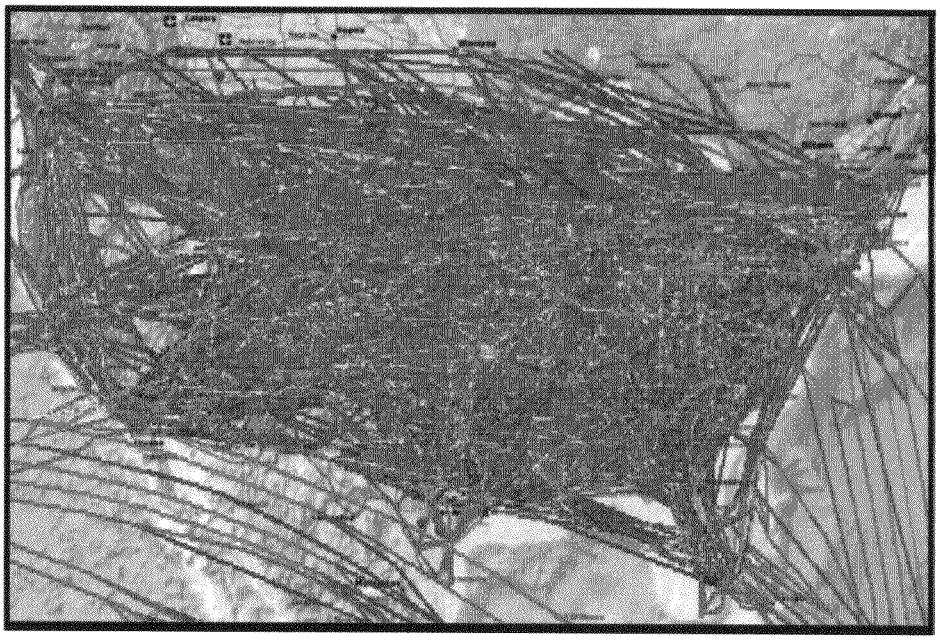
FIGS. 1-3 illustrate an exemplary heat map, with increasing resolution, for the region representing the continental USA.

The method, technology, and algorithms disclosed herein may be implemented in all software and executed on a data processing hardware system having a standard processor and memory architecture as well as, possibly, access to a database containing data sets representing historical air traffic and/or a network connection for receiving real-time flight data representing one or more aircraft.

The first disclosed method and technology determines optimal geographical locations for ground-based antenna based on overhead air traffic—in units of aircraft as well as the number of seats. In a first step of the disclosed process, a region of airspace and the ground beneath it is divided into a number of units having a determinable resolution. In an illustrative embodiment, for the region geographically representing the contiguous 48 states of the USA, the region may be divided into 0.1 arc degree "grid squares", each square representing approximately 10 km by 10 km depending on latitude, resulting in approximately 80,000 grid squares for the continental USA. Other regions would be described by a different number of grid squares. Note that alternative shapes and sizes may be used as well with the disclosed algorithms and technology, resulting in different numbers of units. Further, the disclosed method applies globally to any geographical region or space.

In a next process step, the air traffic, e.g., number of aircraft and/or corresponding seats, traveling overhead in a designated radius from each grid square is counted according to a specified range of an antenna within the network under design consideration. Any variety of real-time and/or archived data sets can be used to represent the air traffic over a region. For example, Enhanced Traffic Management System (ETMS) data from the FAA, or Aircraft Situation Display to Industry (ASDI) data from the FAA in real-time, for several different historical days or time intervals may be utilized to represent air traffic. Each data set may contain a set of origin-destination (O-D) pairs, one for each aircraft flight for the designated day or time interval. The flight trajectories of an aircraft origin-destination pair may be determined using any number of techniques, including, but not limited to any of: 1) simple great-circle O-D routes, 2) a flight plan defined by a sequence of way-points, and/or, 3) actual flight paths from radar aircraft tracking data sources, such techniques, being equally compatible with the algorithms described herein. Alternatively a data set may comprise all or a portion of real-time air traffic data received and processed as described in U.S. Pat. No. 8,554,458, entitled System And Method For Planning, Disruption Management, And Optimization Of Networked, Scheduled Or On-Demand Air Transport Fleet Trajectory Operations the subject matter of which is incorporated herein by this reference for all purposes.

For each aircraft flight in a data set, the algorithm "flies" the flight, tallying the number of flight paths occurring within a designated radius from one or more points within a grid square. More precisely, for each time interval or "tick" for each flight trajectory, or with other periodicity, a circle around an aircraft is created or "scribed", and the counts (aircraft and seats) of all grid squares within the circle are incremented. Hence, when all flights of a data set are processed, each grid square contains the traffic tally for aircraft and seats flying past the grid square for each time interval for each flight. A process of flying an aircraft that can be utilized with the disclosed system and technique is described in U.S. Pat. No. 8,554,458, entitled System And Method For Planning, Disruption Management, And Optimization Of Networked, Scheduled Or On-Demand Air Transport Fleet Trajectory Operations. The accumulated air traffic data totals for the region or a specific grid square within the region are then compiled and plotted as a "heat map" illustrating the "hot" (high-traffic) and "cold" (low-traffic) locations within the region.

Figure 2:
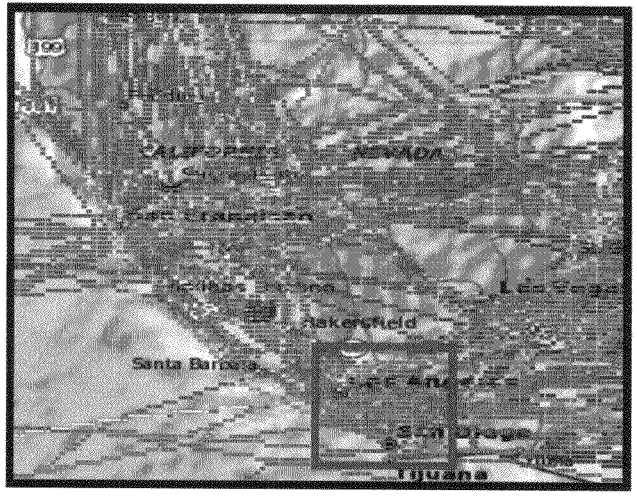
Figure 3:
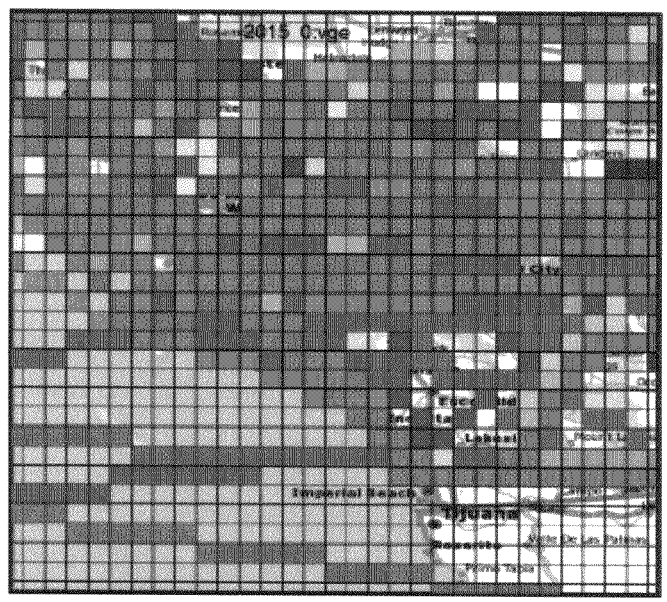

FIGS. 1-3 illustrate an exemplary heat map 100, with increasing resolution, for the region representing the continental USA (NAS), including close-up portions of southern California, as illustrated in FIGS. 2-3. In the illustrative heat map, the color red (or dark grayscale) may indicate a hot or high traffic area, while the color blue (or light grayscale) may indicate a cold or low traffic, with rainbow colors (or various grayscales) indicating for intermediate traffic values between high and low traffic areas. The heat maps of FIGS. 1-3 illustrate traffic volume recorded overhead for each grid square.

Figure 4:
FIG. 4 illustrates a "smeared" version of the heat map of FIG. 1.

For radio reception, grid squares within some radius of the flight path are important too. Therefore, for locating radio antenna ground stations, a circle is created or scribed around each flying aircraft, and the air traffic within the circle (of some designated radius) around each aircraft "smear" as it travels through its respective flight trajectory. FIG. 4 illustrates a "smeared" version 400 of the heat map of FIG. 1. By using the heat map of FIG. 4, in principle, the strongest candidates for ground stations can be effectively and efficiently located.

Other antenna issues notwithstanding, e.g. utility availability, maintenance accessibility, obstacles, etc., the leading candidate locations for a single ground station is the "hottest", i.e. highest, traffic grid square. However, the leading candidate for a second ground station would not necessarily be the second hottest grid square, because if that second hottest grid square is close to the hottest grid square, a likely possibility, the two hottest grid squares would overlap in radio coverage with nearby station(s). With the circular shape of radio coverage areas, some overlap is inevitable. The disclosed algorithm precisely optimizes and controls overlapping among ground stations.

The disclosed algorithm iteratively generates a list of a set of the best ground station locations which are not overlapping. The first ground station is calculated by choosing the "hottest" (highest traffic) grid square. Once a first ground station is chosen, referred to as ground station 1, all the grid squares which are encompassed by the range of the antenna from ground station 1, e.g., typically a circular area having a radius emanating outward from the ground station 1 antenna, are then removed from further subsequent consideration in following iterations of the algorithm. With these already-covered grid squares removed, the airspace traffic is then re-calculated from scratch utilizing the same steps as described previously, including identifying the next hottest grid square based on the data set representing the air traffic as described previously, resulting in a (new) hottest of the grid square subset being chosen as ground station 2. Once ground station 2 is chosen, all the grid squares covered by the combined antenna range coverage of ground station 1 and ground station 2 are removed from further ground station consideration in subsequent iterations of the algorithm. This process is repeated to similarly locate ground station number 3, and so on, until some desired number n of ground station positions have been located.

Figure 5:
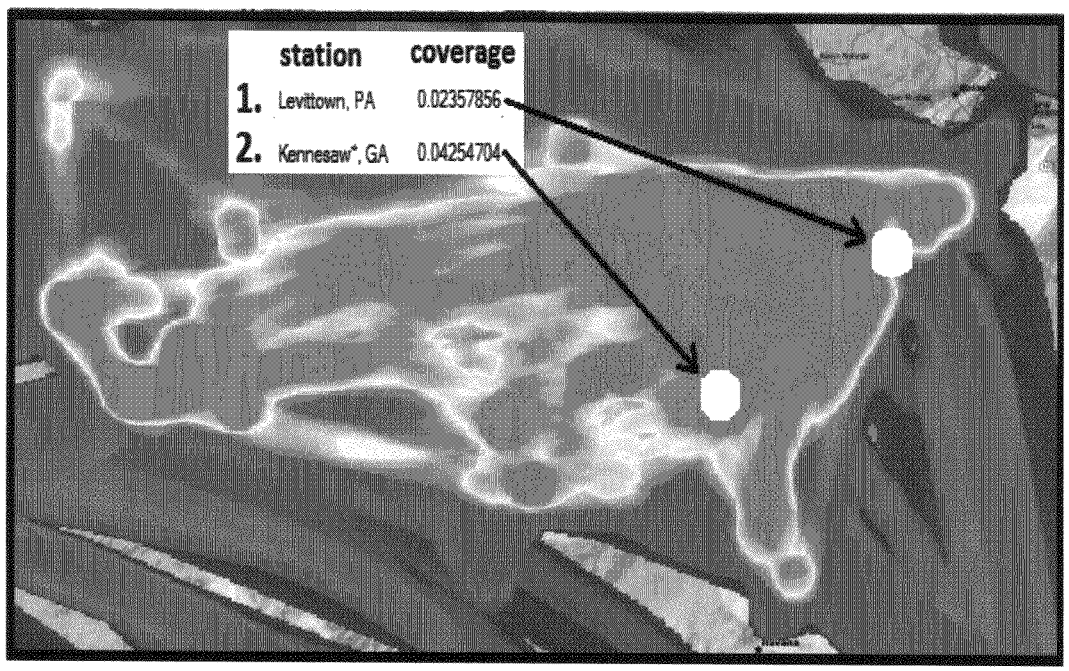
FIG. 5 illustrates a heat map with two ground stations optimally located.
Figure 6:
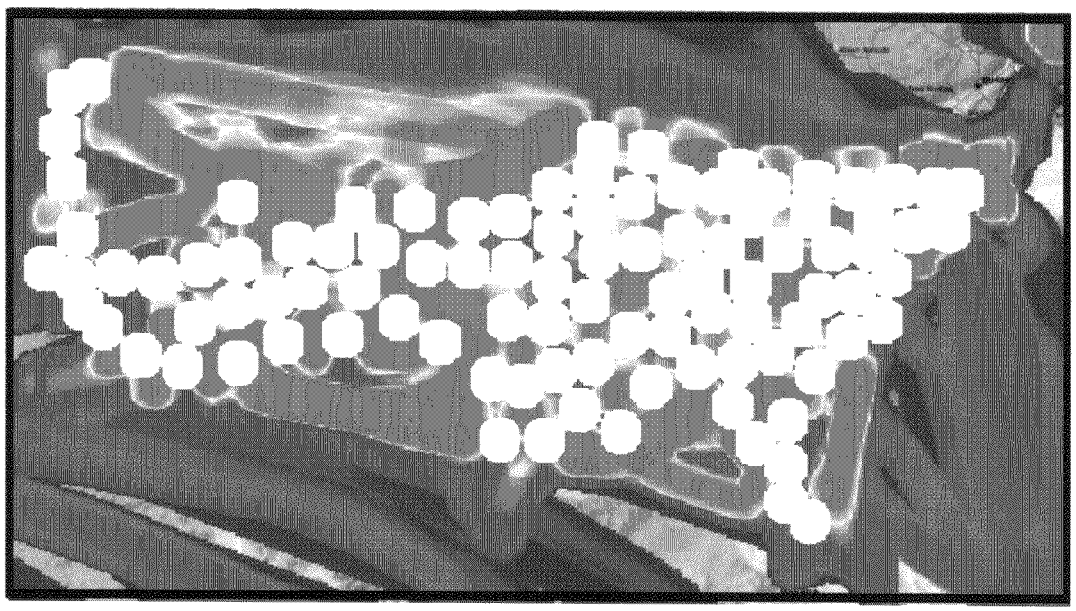
FIG. 6 illustrates a heat map with 200 ground station positions at optimal locations relative to the data set utilized to represent the air traffic over the region as shown in FIG. 5.

FIG. 5 illustrates a heat map 500 with two ground stations optimally located while FIG. 6 illustrates a heat map 600 with 200 ground station positions at optimal locations relative to the data set utilized to represent the air traffic over the region as illustrated in FIG. 5. Each ground station 1-n may be represented in computer memory with a data structure which identifies the ground station as well as its location within the region. An additional parameter within the data structure may represent the range of the antenna associated with the identified ground station. Such antenna range may be defined either on a per ground station basis or globally with a uniform antenna range for all ground station data structures.

In the above-described process, the data representing a particular aircraft may also have associated therewith an exact or estimated number of seats within the aircraft which may be used to further refine results of the algorithms described above relative to bandwidth demands on the contemplated network.

Air-to-Air Communications—Geographical Locating of Ground Stations

With the addition of air-to-air communication capabilities, a mesh network can be implemented with nearby aircraft communicating with each other—in addition to communicating directly with ground stations. The combination of ground-to-air and air-to-air makes it possible to build a network with far fewer ground stations—a far cheaper for more efficient network. Aircraft having the appropriate transceiver apparatus on board no longer need to be within a required distance, e.g., 75 miles, of a ground station; they only need to be indirectly near a ground station via some chain of nearby-to-each-other aircraft which act as intermediate transmission nodes in a dynamically changing network configuration. This connectivity is referred to as "beyond line of sight."

Figure 7:
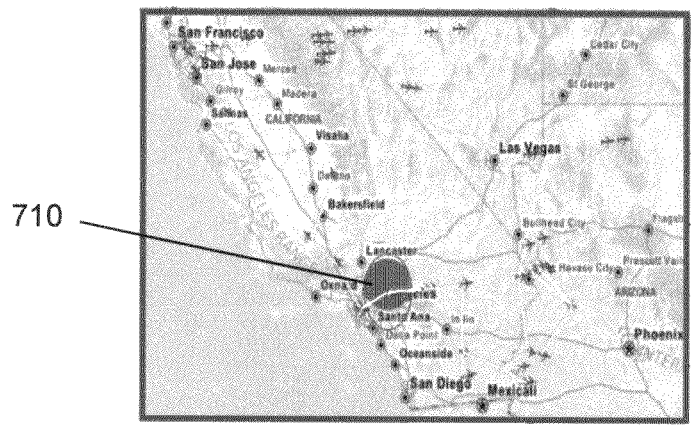
FIG. 7 illustrates the location of a single ground station in southern California in the solid circular area.
Figure 8:
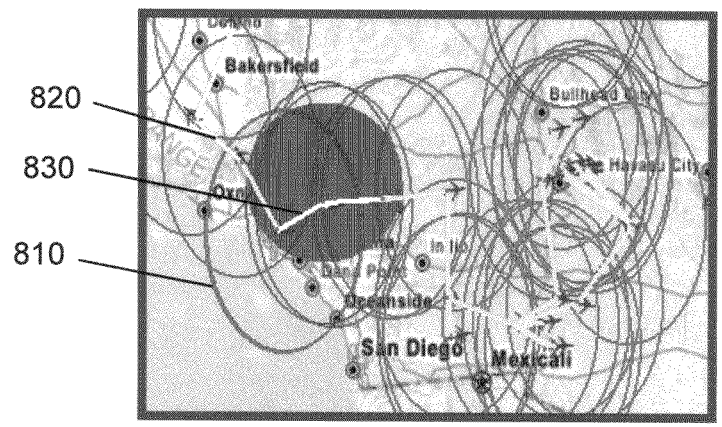
FIGS. 8-9 illustrate a number of aircraft with their limited communication horizons and possible air-to-air communication paths and air-to-ground communication paths.
Figure 9:
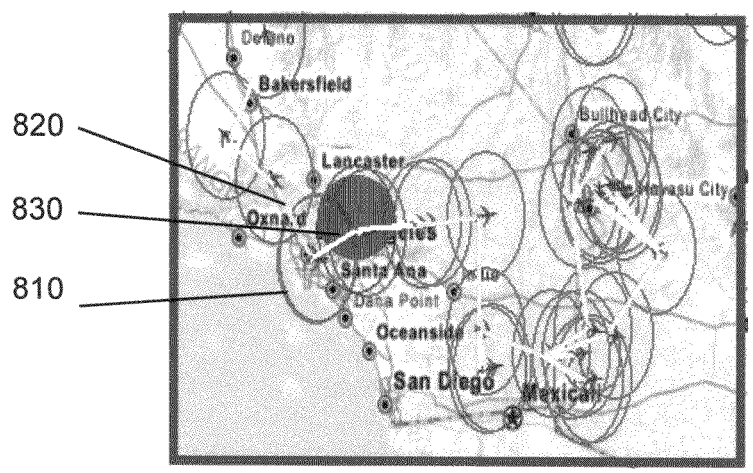

FIG. 7 illustrates the location of a single ground station 710 in southern California in the solid circular area. FIGS. 8-9 illustrate a number of aircraft with their limited communication horizons (hollow "halos") 810 and possible air-to-air communication paths 820 and air-to-ground communication paths 830 in white. As can be seen, many aircraft too far away from the ground station to communicate directly (beyond line of sight), communicate instead indirectly via other aircraft. FIG. 8 illustrates full 75 mile communications halos for the aircraft. For ease of comprehension, FIG. 9 illustrates communications halos having half that diameter (37.5 mile width). Hence, if the aircraft halos in FIG. 9 overlap, then their respective aircraft can successfully communicate. In this fashion, an entire packetized network mesh in an airspace may be constructed.

Performance of the network mesh bandwidth can be purposefully managed in faster than real-time by predicting flight paths to be flown that maintain bandwidth performance objectives by predicting, then flying, paths that achieve desired ground-to-air or air-to-air connectivity. Utilizing the algorithms, techniques and systems for calculating the flight path trajectories of multiple aircraft within an airspace, as disclosed in U.S. Pat. No. 8,554,458, entitled System And Method For Planning, Disruption Management, And Optimization Of Networked, Scheduled Or On-Demand Air Transport Fleet Trajectory Operations, predictive, i.e., faster than real-time, computations of flight paths and their interactions with other aircraft and obstacles may be performed to proactively manage overall mesh network bandwidth uniformity and/or other performance parameters. Such predictive management techniques may comprise any of: 1) actively commanding flight path trajectories and their proximity to one another so as to maintain uniform levels of mesh network connectivity and therefore bandwidth performance, 2) passively observing flight path trajectories and their probable effect on network connectivity and bandwidth, or 3) using a hybrid or combination of active and passive techniques to position aerial assets, e.g. aircraft with antennae, along flight paths, relative to ground stations, that maintain mesh network performance and air traffic safety objectives.

Figure 10:
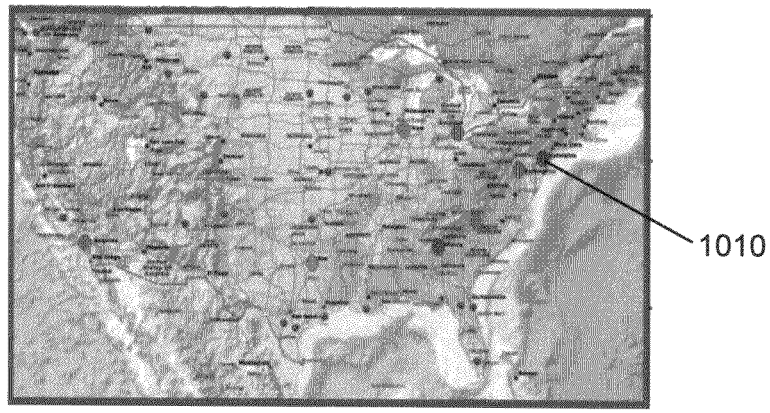
FIG. 10 illustrates 10 ground stations serving the vast majority of aircraft.
Figure 11:
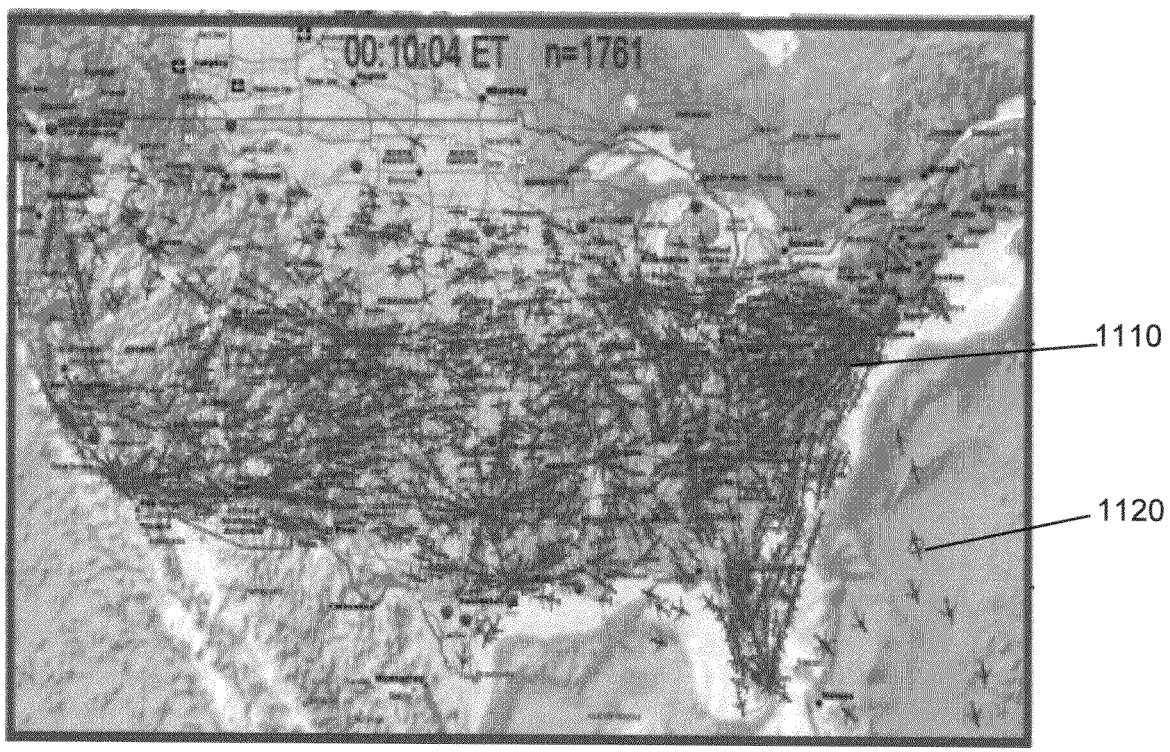
FIG. 11 illustrates a mesh network of aircraft.
Figure 12:
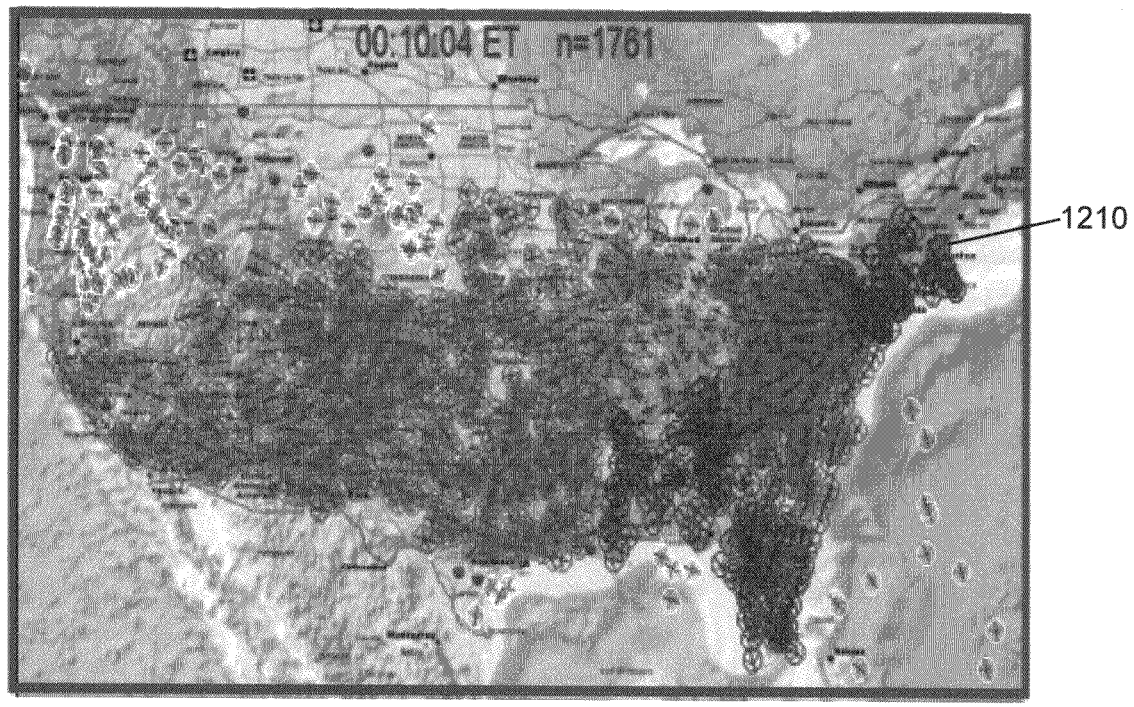
FIG. 12 illustrates flight paths with halos encircling each aircraft.

With relatively few properly located ground stations, an aircraft-enhanced mesh can serve large numbers of aircraft, even those far from ground stations. FIG. 10 illustrates 10 ground stations 1010 serving the vast majority of aircraft. In FIG. 11, aircraft 1110 are on the mesh network (a majority of the aircraft in the illustration) are treated differently than those aircraft 1120 which are outside of the network. In FIG. 12, halos 1210 encircle each aircraft, the shading indicating which ground station is closest, and therefore mostly likely to be serving the aircraft.

Note that for the instant in time illustrated in FIGS. 10-12, for the several thousand aircraft and their instantaneous locations within the airspace above the continental US, fewer ground stations could serve the network under contemplation. At other times of the day, however, the number of aircraft will be dynamically located in different geographical places and, accordingly, the number of ground stations necessary for implementing the network may be different. Furthermore, nearby ground stations in high traffic areas can provide the extra reliability of redundancy, as well as additional bandwidth. The contemplated algorithms to determine the feasibility of air to air and air to ground communications search the abstract trade-off space of the competing needs for coverage of aircraft, bandwidth, reliability though redundancy, latency, etc., to find the optimal set of ground stations, given a specified budget for ground stations, radio reach, network switching speeds, etc.

Figure 13:
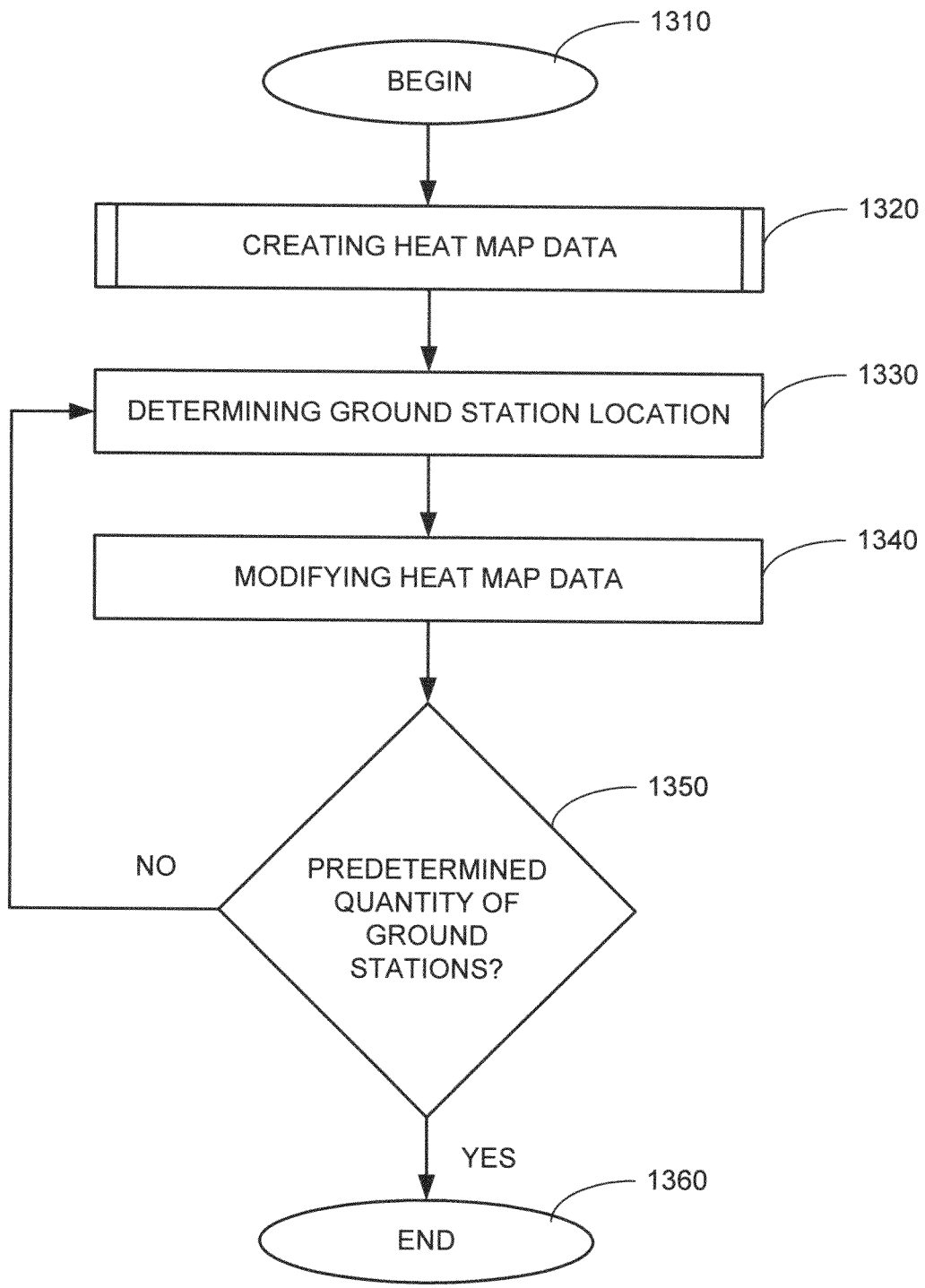
FIGS. 13-15 are flow diagrams illustrating a method for determining locations of telecommunication ground stations, in accordance with an embodiment of the disclosure.
Figure 14:
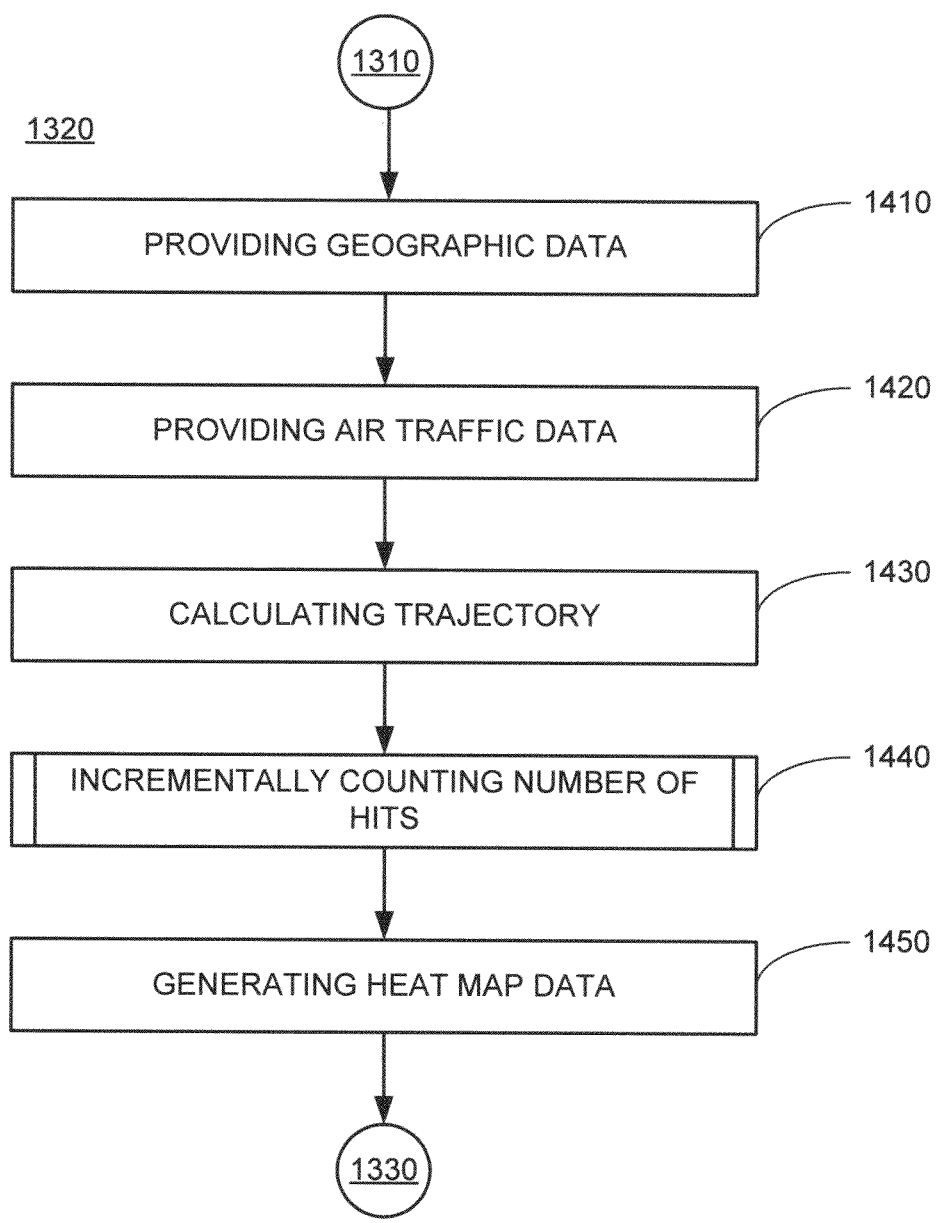
Figure 15:
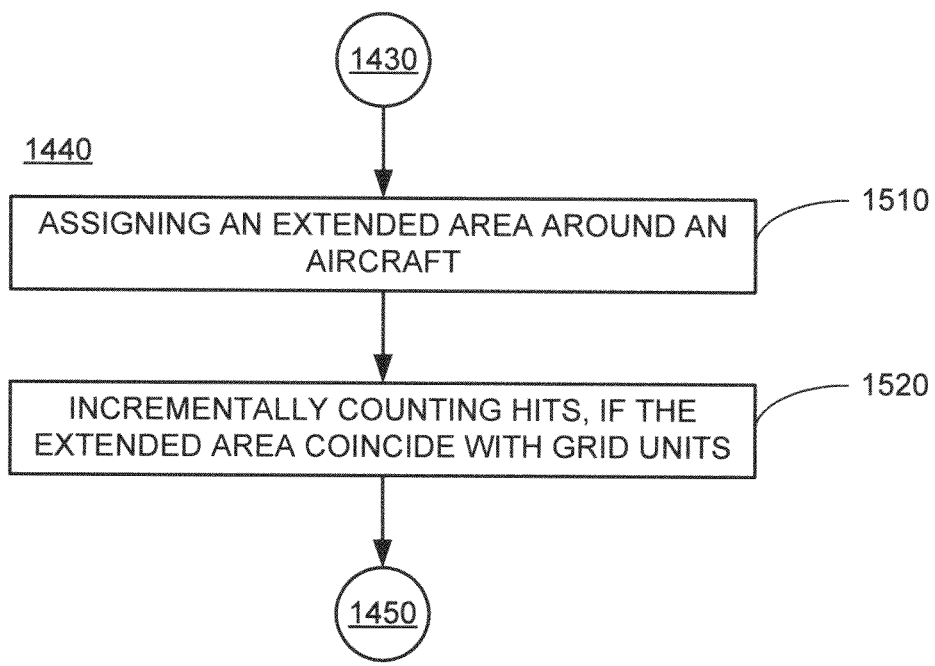

FIGS. 13-15 are flow diagrams illustrating a method for determining locations of telecommunication ground stations, in accordance with an embodiment of the present invention. Referring to FIG. 13, the method begins from Step 1310. In step 1320, heat map data is created to represent air traffic volume at grid units of a geographic region. In step 1330, a location of a ground station is determined at one of the grid units having air traffic volume greater than that of others of the grid units. In Step 1340, the heat map data is modified by excluding data representing one or more of the grid units surrounding the ground station location. In one embodiment, the heat map data is modified by excluding data representing one or more of the grid units surrounding the ground station location in accordance with a communication range of a ground station antenna. In Step 1350, a decision is made as to whether a predetermined quantity (e.g., 200) of ground station locations has been determined. If the predetermined quantify of ground station locations has been determined, then the method ends at Step 1360, otherwise Steps 1330 and 1340 are repeated.

Referring to FIG. 14, Step 1320 in FIG. 13 comprises additional steps. In Step 1410, geographic data is provided to represent the geographic region, the geographic data including grid data representing the grid units. In Step 1420, air traffic data is provided to represent origin and destination of flights within a predetermined time period. In Step 1430, a trajectory is calculated for each of the flights using the air traffic data and the geographic data. In Step 1440, a number of hits is incrementally counted for each of the grid units, if the trajectory for each of the flights coincides with the grid units. In Step 1450, the heat map data is created in accordance with a total number of hits for each of the grid units.

Referring to FIG. 15, Step 1440 in FIG. 14 may comprise additional steps. In Step 1510, an extended area is assigned around an aircraft traversing a flight trajectory. In Step 1520, a number of hits is incrementally counted for each of the grid units, if the extended area coincides with the grid units.

In one embodiment, the air traffic volume is represented by the total number of hits for each of the grid units. In one embodiment, the air traffic data comprises data representing a number of seats for each of the flights, and the air traffic volume is represented by the total number of hits for each of the grid units modified by the number of seats for each of the flights. In one embodiment, each of the grid units corresponds to a grid square of about 0.1 arc degree.

Figure 16:
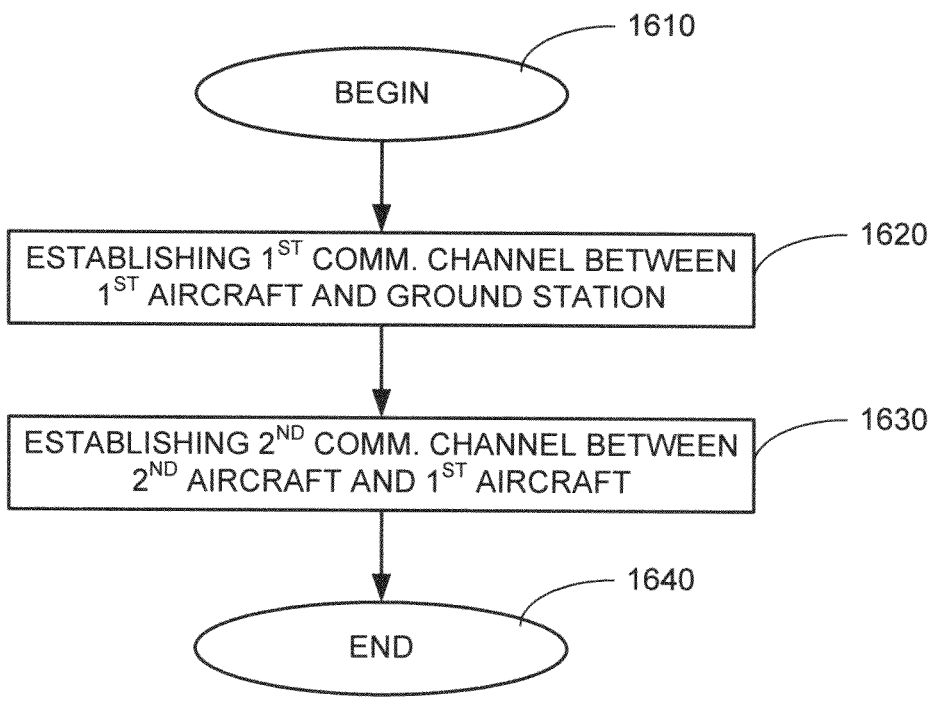
FIG. 16 is a flow diagram illustrating a method for establishing network communications from an aircraft, in accordance with an embodiment of the disclosure.

FIG. 16 is a flow diagram illustrating a method for establishing network communications from an aircraft, in accordance with an embodiment of the present invention. Referring to FIG. 16, the method for establishing network communications begins from Step 1610. In Step 1620, a first communication channel is established between a first aircraft and a ground station having an antenna. The first aircraft is located within a communication range of the antenna. In one embodiment, the communication range comprises a substantially circular region centered around the ground station. In Step 1630, a second communication channel is established between a second aircraft and the first aircraft. The second aircraft is located outside of the communication range of the antenna. In one embodiment, a communication device on the second aircraft is communicably coupled to a communications network through the second communication channel and the first communication channel. The method for establishing network communications ends at Step 1640.

System Platform and Network Environment

Figure 17:
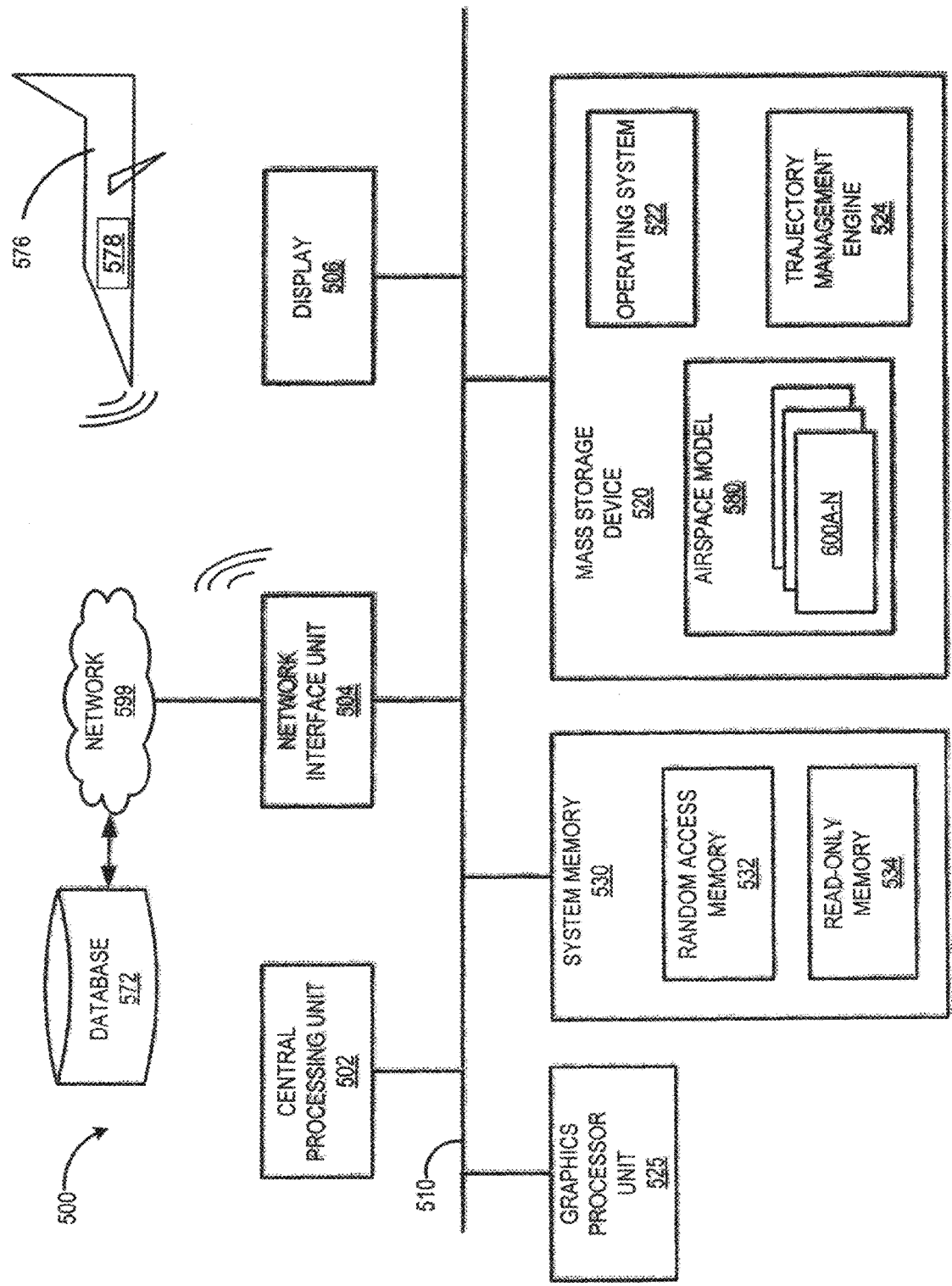
FIG. 17 illustrates conceptually a block diagram of an illustrative architecture of a processing platform for managing aircraft trajectories in accordance with embodiments of the present disclosure.

FIG. 17 illustrates conceptually a block diagram of an illustrative architecture of a processing system for managing aircraft trajectories in accordance with systems and techniques disclosed herein. System 500 may comprise a central processing unit 502 (CPU), a system memory 530, including a random access memory 532 (RAM) and a read-only memory 534 (ROM), and a system bus 510 that can couple the system memory 530 to the CPU 502. An input/output system containing the basic routines that help to transfer information between elements within the computer architecture 500, such as during startup, can be stored in the ROM 534. The computer architecture 500 may further include a mass storage device 520 for storing an operating system 522, software, data, and various program modules, such as the trajectory management engine 524.

The mass storage device 520 can be connected to the CPU 502 through a mass storage controller (not illustrated) connected to the bus 510. The mass storage device 520 and its associated computer-readable media can provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable media may include volatile and non-volatile, removable and non-removable media implemented in any method or technology for the non-transitory storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 599. The computer architecture 500 may connect to the network 599 through a network interface unit 504 connected to the bus 510. It should be appreciated that the network interface unit 504 may also be utilized to connect to other types of networks and remote computer systems, such as a computer system on board an aircraft 576. The computer architecture 500 may also include an input/output controller for receiving and processing input from a number of other devices, including a keyboard, mouse, or electronic stylus (not illustrated). Similarly, an input/output controller may provide output to a video display 506, a printer, or other type of output device. A graphics processor unit 525 may also be connected to the bus 510.

As mentioned briefly above, a number of program modules and data files may be stored in the mass storage device 520 and RAM 532 of the computer architecture 500, including an operating system 522 suitable for controlling the operation of a networked desktop, laptop, server computer, or other computing environment. The mass storage device 520, ROM 534, and RAM 532 may also store one or more program modules. In particular, the mass storage device 520, the ROM 534, and the RAM 532 may store the trajectory management engine 524 for execution by the CPU 502. The trajectory management engine 524 can include software components for implementing portions of the processes discussed in detail with respect to the Figures. The mass storage device 520, the ROM 534, and the RAM 532 may also store other types of program modules.

Software modules, such as the various modules within the trajectory management engine 524 may be associated with the system memory 530, the mass storage device 520, or otherwise. According to embodiments, the trajectory management engine 524 may be stored on the network 599 and executed by any computer within the network 599.

The software modules may include software instructions that, when loaded into the CPU 502 and executed, transform a general-purpose computing system into a special-purpose computing system customized to facilitate all, or part of, management of aircraft trajectories within an airspace techniques disclosed herein. As detailed throughout this description, the program modules may provide various tools or techniques by which the computer architecture 500 may participate within the overall systems or operating environments using the components, logic flows, and/or data structures discussed herein.

The CPU 502 may be constructed from any number of transistors or other circuit elements, which may individually or collectively assume any number of states. More specifically, the CPU 502 may operate as a state machine or finite-state machine. Such a machine may be transformed to a second machine, or specific machine by loading executable instructions contained within the program modules. These computer-executable instructions may transform the CPU 502 by specifying how the CPU 502 transitions between states, thereby transforming the transistors or other circuit elements constituting the CPU 502 from a first machine to a second machine, wherein the second machine may be specifically configured to manage trajectories of aircraft within an airspace. The states of either machine may also be transformed by receiving input from one or more user input devices associated with the input/output controller, the network interface unit 504, other peripherals, other interfaces, or one or more users or other actors. Either machine may also transform states, or various physical characteristics of various output devices such as printers, speakers, video displays, or otherwise.

Encoding of the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the system memory 530 when the software is encoded therein. For example, the software may transform the state of transistors, capacitors, or other discrete circuit elements constituting the system memory 530.

As another example, the storage media may be implemented using magnetic or optical technology. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Although there are on the order of 5000 IFR aircraft in the NAS at typical peak periods, the systems and techniques disclosed herein are able to simulate several times as many aircraft (>10000) flying enroute trajectories simultaneously. Simulating large numbers of dynamically replanned aircraft trajectories in faster than real time requires considerable compute power. For ~100 aircraft, a conventional CPU (multi-core, one machine) computer hardware will suffice utilizing the algorithms disclosed herein. In order to simulate a complete airspace with $10^3$-$10^5$ aircraft GPU (Graphics Processor Unit) technology is appropriate. Modern GPUs have greater than 400 computing streams ("cores") running in parallel on each board. As such, in one illustrative embodiment, CPU 502 of computer architecture 500 may be implemented with a GPU 525, such as the Nvidia GTX470 GPU with 448 cores, commercially available from NVIDIA Corporation, Santa Clara, Calif. 95050, USA. Using a water-cooled case, three such GPUs may be implemented in one desktop computer, or about 1350 cores, achieving a performance of about 2 teraflops at a cost of about $2 per gigaflop. This is more than a thousand times cheaper than a decade ago and continues an exponential path that has remained unbroken for 50 years. Within another decade, it is conceivable that this amount of computing power could reside in an aircraft's cockpit. With a single GPU, the estimated gain is an approximate 100 times performance increase over conventional CPU single-core hardware architecture.

GPUs enable dramatically more computation for modeling assuming the disclosed algorithms are adapted to the parallel processing paradigm of the GPU, a task within the cup competency of one reasonably skilled in the arts, given the teachings, including the flowchart and pseudocode examples, contained herein. The GPU enables millions of software threads, up to 400 plus threads operating simultaneously. Fortunately, thousands of aircraft running simultaneous re-planning algorithms maps very well to the GPU parallel processing architecture. A bonus of using modern GPUs is advanced graphics, since GPUs were developed for video game applications. Accordingly, display 106 may be implemented with a high fidelity visual output device capable of simultaneously rendering numerous trajectories and their periodic updates in accordance with the system and techniques disclosed herein.

The software algorithms utilized by the system disclosed herein may be written in a number of languages including, C #, Python, Cuda, etc. For example, the trajectory management system 524, including any associated user interface therefore may be written in C sharp. High level control of the GPU, web interface, and other functions may be written in Python. Detailed control of the GPU may be written in Cuda and similar languages (Cuda is a C-like language provided by Nvidia for writing parallel processing algorithms). Such algorithms may execute under the control of the operating system environment running on generally available hardware including PCs, laptops, and GPUs. For example, as noted above, GPU 525, may be utilized alone, or in conjunction with parallel processing hardware to implement in excess of 1000 cores, enabling a multi-threaded software model with millions of threads of control. Hence, many threads can dedicated per aircraft Trajectory or Dynamical Path.

Figure 18A:
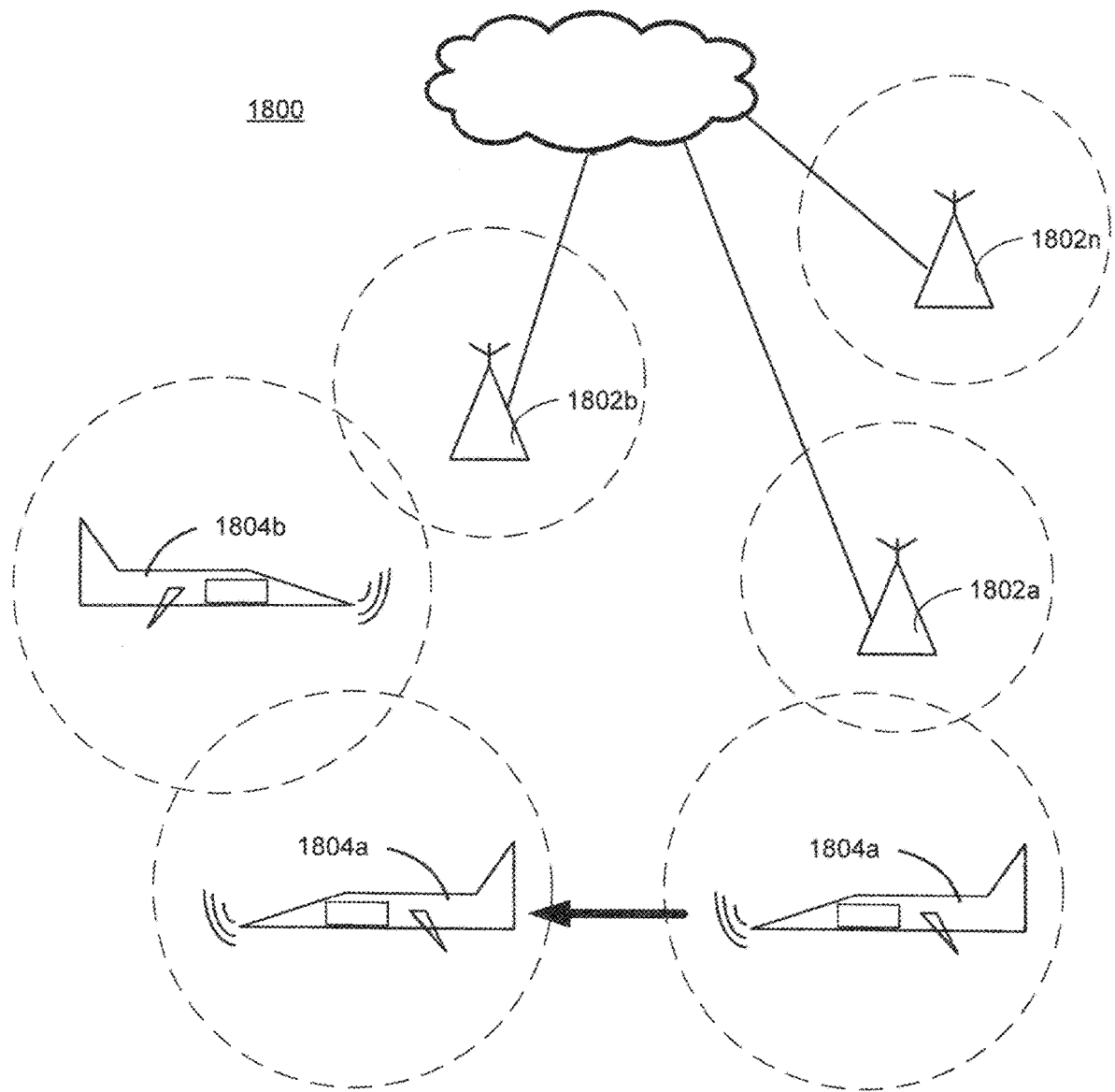
FIGS. 18*a-b* illustrate conceptually exemplary dynamic networks in accordance with embodiments of the present disclosure.
Figure 18B:
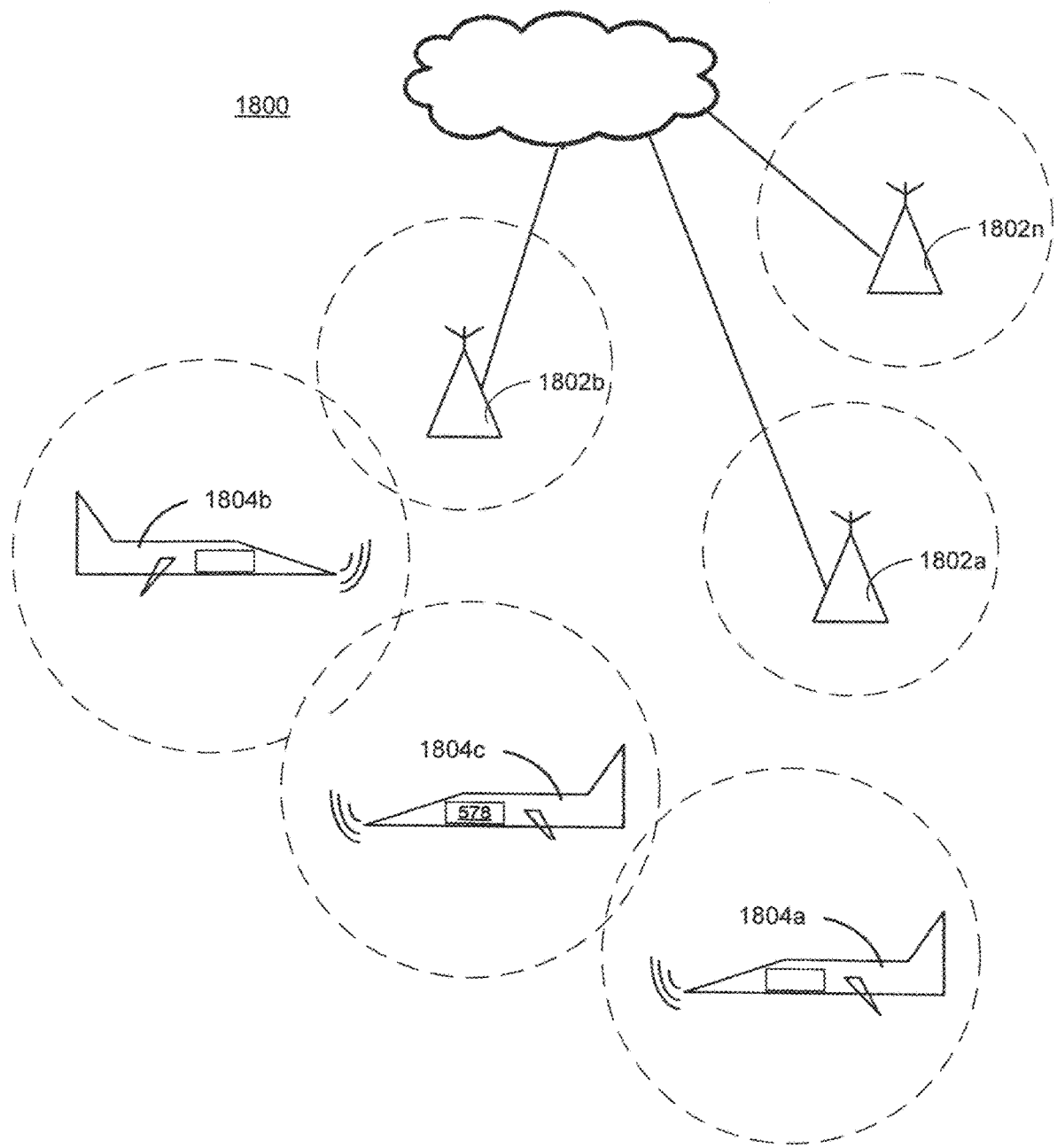

FIGS. 18*a-b* illustrates conceptually an exemplary network in accordance with embodiments of the present disclosure. As illustrated, network 1800 comprises a plurality of ground stations 1802*a-n*, each having an antenna with a range, illustrated with a circle, by which it may communicate with other communication devices, including those on board a plurality of aircraft 1804*a-n*, having the appropriate communication apparatus with a range, also illustrated with a circle, over any number of know communication protocols. Ground stations 1802*a-n* may be operably coupled to a network topology comprising any communication technologies, illustrated generally as network cloud 1806.

As illustrated in FIG. 18*a*, a communication connection or channel may be established directly from a first aircraft 1804*a*, or a device thereon, to ground station 1802*a* and indirectly network cloud 1806, when first aircraft 1804*a* is in range of ground station 1802*a*, as illustrated by their respective overlapping circles. As first aircraft 1804*a* moves out of range of ground station 1802*a*, a communication connection or channel may be established indirectly from first aircraft 1804*a* to ground station 1802*b* using a second aircraft 1804*b* as an interim transmission and receiving node, as illustrated by their respective overlapping circles between first aircraft 1804*a* and second aircraft 1804*b* and between ground station 1802*b* and a second aircraft 1804*b*. In this manner, each aircraft may serve as a transceiver node whose position changes dynamically relative to other aircraft 1804 and other ground stations 1802, enabling establishment of dynamic pathways between out of range aircraft and ground stations, if at least aircraft 1804 in a chain of relayed aircraft communications is currently within range of at least one ground station antenna 1802.

As illustrated in FIG. 18*b*, a communication connection or channel may be established indirectly from first aircraft 1804*a* to ground station 1802*b*, and indirectly to network cloud 1806, by establishing a communication connection chain with multiple aircraft 1804*b-c*, if at least one aircraft in the chain of relayed aircraft communications is currently within range of ground station antenna, as illustrated by the respective overlapping circles between first aircraft 1804*a* and second aircraft 1804*c* and between second aircraft 1804*c* and third aircraft 1804*b* and between ground station 1802*b* and a third aircraft 1804*b*. Note that in one embodiment the first aircraft 1804*a* may establish multiple redundant connections, either sequentially or simultaneously, with other aircraft 1804*b-n*, which may be in or out of range with the same or different ground stations 1802*a-n* to maintain connections as the aircraft move in or out of range of various ground stations.

Although the present invention has been described in detail with respect to various embodiments, it is appreciated that the present invention may have various further and/or other embodiments that fall within the spirit and scope of the appended claims.

What is claimed is:

1. A method for managing a mobile mesh network including a plurality of aircraft and ground stations of an air-to-ground (ATG) network, the method comprising:
    determining a location and corresponding coverage area for a plurality of ground stations defining coverage areas that have at least some gaps therebetween;
    passively observing flight path trajectories of a plurality of aircraft and assigning a mobile coverage area to at least some of the corresponding flight path trajectories;
    determining a probabilistic effect on network connectivity and bandwidth of the flight path trajectories; and
    actively commanding some flight path trajectories to maintain uniform levels of network connectivity and bandwidth.

2. The method of claim 1, wherein assigning the mobile coverage area comprises defining a halo of a predetermined distance around aircraft that are part of the mobile mesh network.

3. The method of claim 2, wherein actively commanding some flight path trajectories comprises actively commanding a trajectory of one or more aircraft in order to maintain the uniform levels of network connectivity and bandwidth while maintaining air traffic safety objectives.

4. The method of claim 2, wherein the halo is displayed with a distinct color indicative of which one of the ground stations is most likely to serve an aircraft associated with the halo.

5. The method of claim 2, wherein assigning the mobile coverage area comprises defining the halo as a moving area associated with predicted future positions of an aircraft associated with the halo based on a predicted flight path of the aircraft associated with the halo.

6. The method of claim 5, wherein the predicted flight path is determined based on air traffic data including an origin and destination of a flight associated with the aircraft.

7. The method of claim 1, further comprising:
    dividing a geographic area into a plurality of grid squares;
    counting a number of hits for each grid square based on a number of flights having a trajectory within a predetermined communication distance of the each grid square; and
    determining air traffic volume based on the number of hits.

8. The method of claim 7, counting the number of hits further comprises incrementing the number of hits based on flights having a halo of a predefined distance around an aircraft associated with the halo that intersects with the each grid square.

9. The method of claim 1, wherein maintaining uniform levels of network connectivity and bandwidth comprises maintaining network switching speeds.

10. The method of claim 1, wherein maintaining uniform levels of network connectivity and bandwidth comprises maintaining a latency value or a given budget for network switching speed.

11. A network managing device for managing a mobile mesh network including a plurality of aircraft and ground stations of an air-to-ground (ATG) network, the device comprising processing circuitry configured to:
- determine a location and corresponding coverage area for a plurality of ground stations defining coverage areas that have at least some gaps therebetween;
- passively observe flight path trajectories of a plurality of aircraft and assign a mobile coverage area to at least some of the corresponding flight path trajectories;
- determine a probabilistic effect on network connectivity and bandwidth of the flight path trajectories; and
- actively commanding some flight path trajectories to maintain uniform levels of network connectivity and bandwidth.

12. The network managing device of claim 11, wherein assigning the mobile coverage area comprises defining a halo of a predetermined distance around aircraft that are part of the mobile mesh network.

13. The network managing device of claim 12, wherein actively commanding some flight path trajectories comprises actively commanding a trajectory of one or more aircraft in order to maintain the uniform levels of network connectivity and bandwidth while maintaining air traffic safety objectives.

14. The network managing device of claim 12, wherein the halo is displayed with a distinct color indicative of which one of the ground stations is most likely to serve an aircraft associated with the halo.

15. The network managing device of claim 12, wherein assigning the mobile coverage area comprises defining the halo as a moving area associated with predicted future positions of an aircraft associated with the halo based on a predicted flight path of the aircraft associated with the halo.

16. The network managing device of claim 15, wherein the predicted flight path is determined based on air traffic data including an origin and destination of a flight associated with the aircraft.

17. The network managing device of claim 11, wherein the device is further configured for:
- dividing a geographic area into a plurality of grid squares;
- counting a number of hits for each grid square based on a number of flights having a trajectory within a predetermined communication distance of the each grid square; and
- determining air traffic volume based on the number of hits.

18. The network managing device of claim 17, counting the number of hits further comprises incrementing the number of hits based on flights having a halo of a predefined distance around an aircraft associated with the halo that intersects with the each grid square.

19. The network managing device of claim 11, wherein maintaining uniform levels of network connectivity and bandwidth comprises maintaining network switching speeds.

20. The network managing device of claim 11, wherein maintaining uniform levels of network connectivity and bandwidth comprises maintaining a latency value or a given budget for network switching speed.

* * * * *